(12) United States Patent
Janssen (10) Patent No.: US 12,503,134 B2
(45) Date of Patent: Dec. 23, 2025

(54) METHOD FOR A SCENE INTERPRETATION OF AN ENVIRONMENT OF A VEHICLE

(71) Applicant: Robert Bosch GmbH, Stuttgart (DE)

(72) Inventor: Holger Janssen, Hessisch Oldendorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 636 days.

(21) Appl. No.: 17/732,922

(22) Filed: Apr. 29, 2022

(65) Prior Publication Data

US 2022/0355818 A1 Nov. 10, 2022

(30) Foreign Application Priority Data

May 10, 2021 (DE) .................. 10 2021 204 687.8

(51) Int. Cl.
*B60W 60/00* (2020.01)
*B60W 40/04* (2006.01)
*G06N 3/04* (2023.01)

(52) U.S. Cl.
CPC .......... *B60W 60/001* (2020.02); *B60W 40/04* (2013.01); *G06N 3/04* (2013.01); *B60W 2552/00* (2020.02); *B60W 2554/4041* (2020.02)

(58) Field of Classification Search
CPC ............... B60W 60/001; B60W 40/04; B60W 2552/00; B60W 2554/4041; B60W 50/0098; B60W 2050/0043; B60W 2552/53; B60W 2555/60; G06N 3/04; G06N 3/045; G06V 10/82; G06V 20/58; G01S 7/24; G01S 13/86; G01S 13/865; G01S 13/867; G01S 13/89; G01S 13/931; G01S 17/89; G01S 17/931; G01S 17/86
See application file for complete search history.

(56) References Cited

U.S. PATENT DOCUMENTS

| | | | | |
|---|---|---|---|---|
| 2018/0173973 | A1* | 6/2018 | Hattori | G06F 18/24 |
| 2018/0231387 | A1* | 8/2018 | Thiel | G01C 21/3811 |
| 2018/0374357 | A1* | 12/2018 | Hosokawa | B60W 30/0953 |
| 2019/0346847 | A1* | 11/2019 | Kamata | G05D 1/0257 |
| 2020/0191591 | A1* | 6/2020 | Zhang | G06V 20/582 |
| 2020/0380305 | A1* | 12/2020 | Sharma | G06V 20/56 |

(Continued)

*Primary Examiner* — Abby Lin
*Assistant Examiner* — Danielle M Jackson
(74) *Attorney, Agent, or Firm* — NORTON ROSE FULBRIGHT US LLP (57) ABSTRACT

A method for a scene interpretation of an environment of a vehicle. The method includes: receiving environment sensor data from at least one environment sensor of a vehicle; carrying out an object detection based on the environment sensor data and detecting first objects in the environment of the vehicle; carrying out a scene analysis of the environment by taking into consideration the detected first objects and second objects stored in a map display of the environment, the scene analysis including: comparing the first objects detected in the object detection based on the environment sensor data to the second objects of the map display; and supplying a scene interpretation based on the scene analysis to a vehicle control of the vehicle, and at least the first objects detected in the object detection that agree with corresponding second objects of the map display are considered in the scene interpretation.

25 Claims, 6 Drawing Sheets

(56) References Cited

U.S. PATENT DOCUMENTS

| | | | |
|---|---|---|---|
| 2022/0136859 A1* | 5/2022 | Tanaka | G01C 21/32 |
| | | | 701/450 |
| 2022/0214187 A1* | 7/2022 | Liu | G06T 19/00 |
| 2022/0341749 A1* | 10/2022 | Voigt | G01S 17/931 |
| 2022/0348211 A1* | 11/2022 | Hofbauer | G08G 1/096716 |

* cited by examiner

METHOD FOR A SCENE INTERPRETATION OF AN ENVIRONMENT OF A VEHICLE

CROSS REFERENCE

The present application claims the benefit under 35 U.S.C. 119 of German Patent Application No. DE 10 2021 204 687.8 filed on May 10, 2021, which is expressly incorporated herein by reference in its entirety.

FIELD

The present invention relates to a method for a scene interpretation of an environment of a vehicle.

BACKGROUND INFORMATION

For the realization of (partially) automated driver-assistance systems, vehicles use video cameras and other sensors such as radar or lidar sensors to acquire the vehicle environment. The higher the automatization degree, the greater the demands on the robustness, availability and accuracy of the information supplied by the vehicle environment acquisition. To satisfy these demands, sensor systems that have increasingly complex designs are used and/or information from different sensor modalities (e.g., video and radar) is combined using fusion methods. However, the problem of assessing whether the objects in the environment of the vehicle are reliably detected still remains.

SUMMARY

It is an object of the present invention to provide a method for a scene interpretation of an environment of a vehicle.

This object may be achieved by a method for a scene interpretation of an environment of a vehicle in accordance with the present invention. Advantageous refinements of the present invention are disclosed herein.

According to one aspect of the present invention, a method for a scene interpretation of an environment of a vehicle is provided. In accordance with an example embodiment of the present invention, the method includes:
receiving environment sensor data from at least one environment sensor of a vehicle;
carrying out an object detection based on the environment sensor data, and detecting first objects in the environment of the vehicle;
carrying out a scene analysis of the environment by taking into consideration the detected first objects and second objects stored in a map display of the environment, the scene analysis including:
comparing the first objects detected in the object detection of the environment sensor data with the second objects of the map display; and
providing a scene interpretation based on the scene analysis to a vehicle control of the vehicle, the scene interpretation taking into account at least the first objects of the object detection that agree with corresponding second objects of the map display.

This makes it possible to achieve a technical advantage of providing an improved method for a scene interpretation of an environment of a vehicle. The consideration of information of a map display which describes an environment of a vehicle and in which a plurality of objects in this environment is mapped makes it possible to provide a better object detection and therefore an improved and more reliable control of a vehicle. The comparison of the objects in the environment of the vehicle in the object detection based on environment sensor data of the vehicle with the objects of the map display makes it possible to determine a reliability of the object detection based on the environment sensor data of at least one environment sensor of the vehicle. If the objects detected in the object detection agree with the objects stored in the map display, then a correct object detection is able to be assumed. Deviations between the objects detected in the object detection and the objects stored in the map display may also be considered in the scene interpretation, for instance in the form of reduced reliability values of the object detection. The object detection and thus the related scene interpretation may therefore be configured to be more reliable and robust, which in turn leads to a better control of the vehicle.

An object detection in the sense of the application includes a position detection of a detected object and a classification of the detected object into a corresponding object class.

A scene interpretation in the sense of the application encompasses an interpretation of the environment of the vehicle based on the detected objects in the object detection and possibly of the objects of the map display. In this context, the scene interpretation considers the position of the detected objects as well as the classification of the detected objects and an interpretation pertaining to a relevance of the respective objects for a control of the vehicle.

A map display in the sense of the application is a virtual map display and may in particular include a two-dimensional or three-dimensional map display.

According to one example embodiment of the present invention, the scene analysis includes:
ascertaining a position of the vehicle on the map display by taking positioning data into consideration;
ascertaining first objects of the environment sensor data and second objects of the map display corresponding to the first objects; and
adapting a perspective alignment of the map display to a perspective alignment of the environment sensor data by aligning the ascertained second objects of the map display with the ascertained first objects of the environment sensor data.

In this way, the technical advantage may be obtained of achieving the most precise comparison of the objects of the object detection and the objects of the map display. By aligning the map display to the perspective alignment of the environment sensor data, a direct comparison of the objects of the environment sensor data detected in the object detection and the objects of the map display is able to be performed. The alignment of the objects of the map display with the objects of the environment sensor data allows for a technically simple alignment of the map display with the perspective alignment of the environment sensor data. This makes it possible to reduce the computational work required to align the map display and the computational effort required to carry out the scene interpretation. A detailed comparison of the objects of the object detection and the objects of the map display is able to be undertaken by bringing the map display to the perspective alignment of the environment sensor data. The comparison may not only be restricted to a presence of the respective object but furthermore could include the positioning of the object in the environment sensor data or a shape of the object. A precise comparison and a related precise scene interpretation are able to be provided as a result.

According to one example embodiment of the present invention, semantic information of the first and second objects and/or shape information and/or positioning information of the first objects in the environment sensor data and of the second objects in the map display is/are taken into account when comparing the first and second objects.

This achieves the technical advantage of being able to provide an accurate comparison of the first objects of the object detection and the second objects of the map display, which takes semantic information of the respective objects, shape information or positioning information of the objects into consideration.

According to one example embodiment of the present invention, the scene analysis includes:
increasing the reliability values of first objects that are detected in the object detection and are represented by corresponding second objects in the map display; and/or reducing the reliability values of first objects that are detected in the object detection and are not represented by corresponding second objects in the map display.

This makes it possible to achieve the technical advantage of a further specification of the scene interpretation in that objects that have a correspondence in the map display are considered at a greater reliability in the scene analysis and/or objects without a corresponding representation are considered at a reduced reliability. The reliability values may relate to the reliability values provided in the object detection and that indicate a probability value at which the respective object was detected.

According to one example embodiment of the present invention, the present method furthermore encompasses:
including first objects in the map display that are not represented by corresponding second objects in the map display if reliability values assigned to the first objects attain or exceed a predefined limit value.

This makes it possible to obtain the technical advantage of allowing for a further improvement in the scene interpretation. The map display may particularly be successively supplemented with information from the object detection based on the environment sensor data, thereby allowing for a successive improvement of the map display and thus of the related scene interpretation and, ultimately, the related control of the vehicle.

According to one example embodiment of the present invention, first objects that are not represented by corresponding second objects in the map display are disregarded in the scene interpretation if the map display satisfies a reliability criterion and/or reliability values assigned to the first objects do not attain or exceed the predefined limit value.

This may achieve the technical advantage of allowing for a further improvement of the scene interpretation. For example, by the comparison with the map display, false positive findings of the object detection may be excluded from consideration in the scene interpretation. These may be based, for instance, on shadow castings or stop lines or asphalt seams of the road on which the vehicle is traveling and which are erroneously interpreted as road markings by the object detection.

According to one example embodiment of the present invention, second objects of the map display for which no corresponding first objects were detected in the object detection are taken into account in the scene interpretation if the map display satisfies the reliability criterion.

This achieves the technical advantage of allowing for a further improvement of the scene interpretation. The consideration of the objects of the map display in the scene analysis makes is possible to further improve the scene interpretation even in case of an incorrect object detection which, for instance, may be the result of poor weather conditions. For example, given heavier snowfall that covers road markings or lane boundaries so that the object detection is unable to detect them, the road markings or lane boundaries may still be taken into consideration in the scene interpretation based on the road markings and traffic lane boundaries stored in the map display, thereby resulting in a more accurate scene interpretation and improved safety in the control of the vehicle.

According to one example embodiment of the present invention, the method furthermore includes:
deleting first objects in the object detection that are not represented by second objects in the map display if the map display satisfies the reliability criterion and/or reliability values allocated to the first objects do not attain or exceed the predefined limit value, and/or deleting second objects (207) in the map display for which no corresponding first objects were detected if the map display (205) does not satisfy the reliability criterion.

This provides the technical advantage of achieving a further improvement of the scene interpretation. The deletion of the objects makes it possible to disregard incorrectly detected objects in the scene interpretation, thereby enabling a further improvement in the control of the vehicle. The reliability criterion indicates that a prioritization of the information of the map display may possibly be implemented vis-à-vis the object detection. The map display may furthermore be improved by deleting from the map display second objects of the map display for which no corresponding first objects were detected. This may particularly be done if in addition to the insufficient reliability of the map display, the corresponding first objects were repeatedly not detected. For instance, this makes it possible to include in the map display brief or temporary changes in the road characteristic.

According to one example embodiment of the present invention, the reliability criterion takes into account that the map display has achieved a reliable representation of the environment at earlier points in time.

This offers the technical advantage of providing a meaningful reliability criterion. The deletion of objects from the object detection may particularly be undertaken if the map display had already been able to supply a reliable representation of the environment of the vehicle at earlier points in time. A representation is reliable if the objects of the environment are represented by the map display according to a predefined limit value. Based on the positive experience of the representability of the map display, the correctness of the information of the map display may thus be inferred so that a correction of the object detection is able to be undertaken if a deviation is present between the object detection and the map display.

According to one example embodiment of the present invention, the second objects of the map display represent static objects in the environment of the vehicle and include road geometries and/or road markings and/or road line markings and/or road boundaries and/or traffic signs and/or traffic light systems and/or infrastructure objects and/or bicycle lanes and/or buildings and/or vegetation.

This makes it possible to achieve the technical advantage of allowing for a further improvement of the scene interpretation. To this end, comprehensive information pertaining to the environment of the vehicle may be incorporated into the scene interpretation by the map display. In particular, a multitude of different objects of the environment of the vehicle that are stored in the map display and that predominantly describe static objects in the environment of the vehicle may be considered in the scene interpretation in the form of a comparison of the objects detected by the object detection to the respective information of the map display. Because of the detailed description of the environment of the vehicle, in particular of the road traveled by the vehicle and corresponding road features and traffic signs, information that is essential for a safe control of the vehicle may become part of the scene interpretation. This makes it possible to further improve the control of the vehicle.

According to one example embodiment of the present invention, the map display is embodied as a geo-referenced map.

This offers the technical advantage that precise information with regard to the objects in the environment of the vehicle including geo-position information of the respective objects is able to be considered in the scene interpretation. This results in an additional improvement in the control.

According to one example embodiment of the present invention, the environment sensor data include image data, video data, LIDAR data or radar data and/or positioning data, GNSS data and/or position sensor data and/or sensor data for acquiring vehicle dynamics.

This may provide the technical advantage of allowing for a precise object detection.

According to one example embodiment of the present invention, the object detection includes a correspondingly trained neural network or a plurality of trained neural networks.

This may achieve the technical advantage of allowing for a precise and robust object detection.

According to a second aspect of the present invention, a processing unit is provided, the processing unit being designed to carry out the method for a scene interpretation of an environment of a vehicle according to one of the preceding embodiments.

According to a third aspect of the present invention, a computer program product is provided which includes instructions that induce a data processing unit to carry out the method for a scene interpretation of an environment of a vehicle as recited in one of the preceding embodiments when the program is executed by the data processing unit.

Exemplary embodiments of the present invention are described based on the following figures.

DETAILED DESCRIPTION OF EXAMPLE EMBODIMENTS

Figure 1:
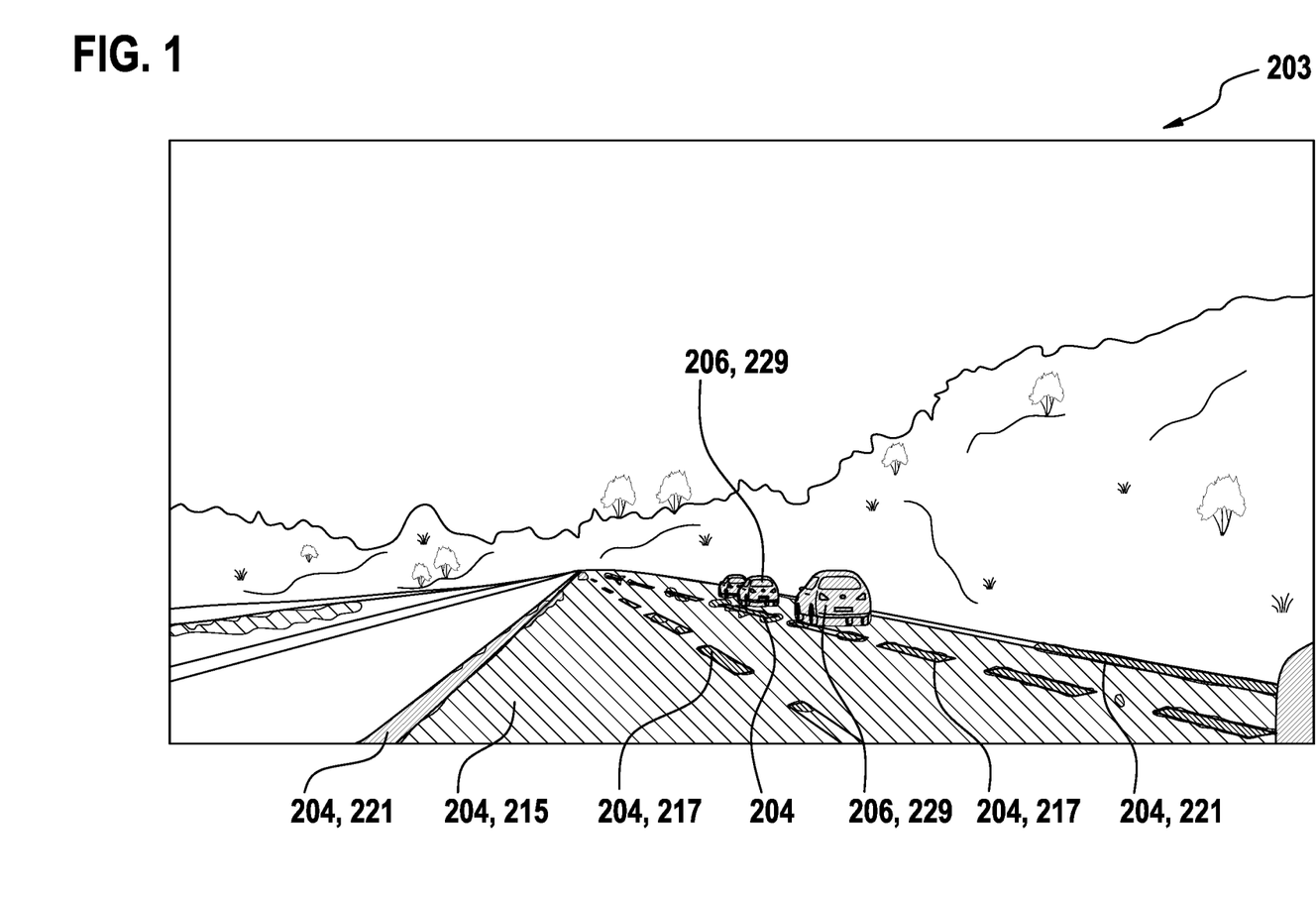
FIG. 1 shows a schematic representation of environment sensor data of an environment of a vehicle according to an example embodiment of the present invention.

FIG. 1 shows a schematic representation of environment sensor data 203 of a vehicle 200 according to an embodiment.

FIG. 1 shows a representation of environment sensor data 203 in the form of an image recording of a camera system or video system of a vehicle. The image recording shows a road course on which the particular vehicle from whose perspective the image recording was made is traveling together with additional vehicles. Multiple road markings and lane boundaries are shown in the image recording. In addition, the image recording shows first objects 204 detected by an object detection and further first objects 206, which are marked by corresponding hatching. In the illustrated embodiment, first objects 204 describe only static objects that are permanently situated in the environment of the vehicle. Further first objects 206, on the other hand, relate to dynamic objects that are moving in the environment of the vehicle. In the illustrated embodiment, first objects 204 in particular describe features of the road course and include road 215, e.g., the roadway geometry and features of the road surface, road markings 217 and road boundaries 221. Further first objects 206 in the illustrated embodiment include additional road users in the form of further vehicles 229, which likewise drive on road 215 traveled by the vehicle. As an alternative to the illustrated embodiment, first objects 204 may additionally describe other static objects in the environment of the vehicle, which may include, for instance, traffic signs, traffic light systems, infrastructure objects, bicycle paths, buildings or vegetation in the environment of the vehicle. In addition to further vehicles such as passenger cars, trucks, motorcycles and bicycles, the dynamic objects represented by further first objects 206 may also represent persons such as pedestrians, or animals in the environment.

In the sense of the application, the environment sensor data are based on at least one environment sensor of the vehicle. In the illustrated embodiment, the environment sensor is embodied as a camera system which supplies image data and/or video data. Alternatively or additionally, environment sensor data may include data from LIDAR systems, radar systems or other conventional environment sensors from the related art.

Figure 2:
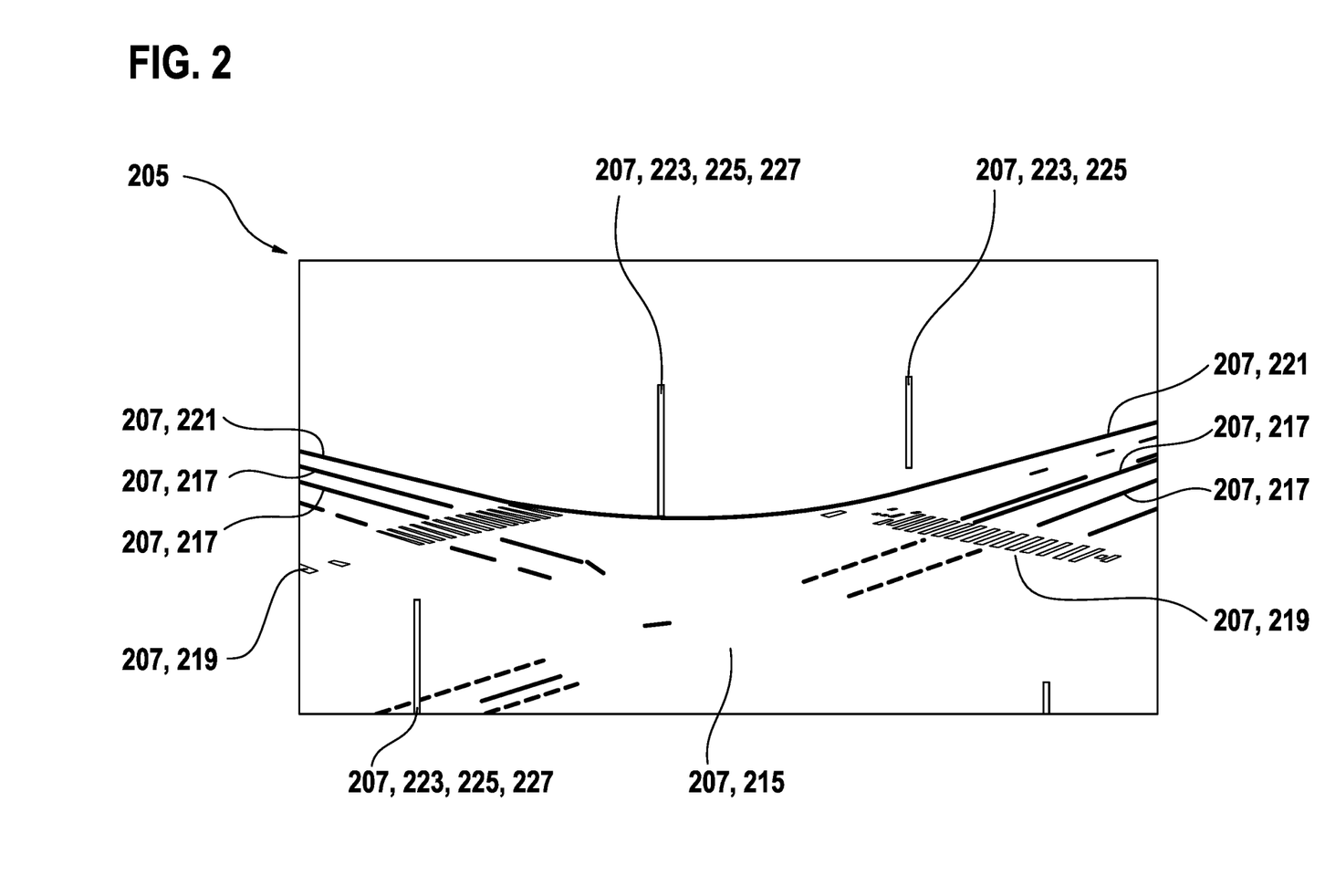
FIG. 2 shows a schematic representation of a map display.

FIG. 2 shows a schematic representation of a map display 205.

In the illustrated embodiment, map display 205 shows a course of a road 215. Multiple different second objects 207 are shown on map display 205. Second objects 207, similar to first objects 204 of the environment sensor data, relate to static objects along the course of road 215. In the illustrated embodiment, second objects 207 include road 215 itself, e.g., the road geometry or the condition of the road surface, road boundaries 221, lane markings 217, road markings 219 in the form of lines such as zebra crossings, and static objects located at the road edge such as street lights 223, power poles 225 or traffic light poles 227.

According to one embodiment, map display 205 is developed as a geo-referenced map so that geo-positions are able to be allocated to the individual second objects 207 of map display 205.

Map display 205 may in particular be developed as a virtual map and possibly include a two-dimensional or three-dimensional display. Map display 205 is suitable especially for the display of an environment of a vehicle traveling on road 215.

For instance, the map display can be based on information that was generated by appropriately performed test drives and/or by vehicles in the fleet of a vehicle manufacturer, what is termed crowd sourcing, during which information was collected that pertains to the static objects of the road course. Alternatively or additionally, map display 205 may include information from position maps, e.g., GPS maps.

Figure 3:
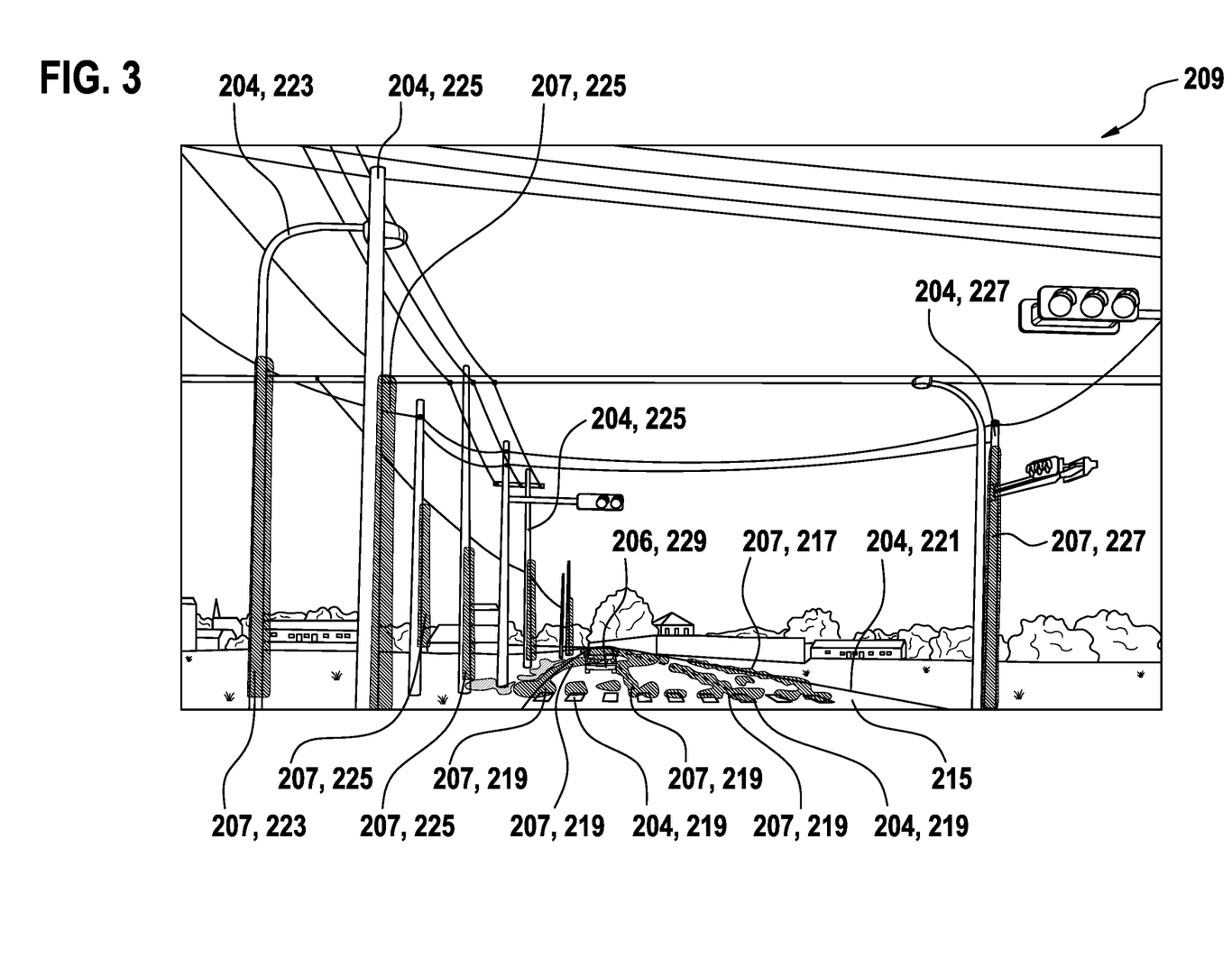
FIG. 3 shows a schematic representation of a projection of a map display onto environment sensor data of an environment of a vehicle.

FIG. 3 shows a schematic illustration of a projection 209 of a map display 205 onto environment sensor data 203 of an environment of a vehicle 200.

In the illustrated embodiment, environment sensor data 203, similar to FIG. 1, are represented as image or video data of an environment of a vehicle traveling on a road 215. In the illustrated embodiment, the environment sensor data show a road course from the perspective of a vehicle, static and dynamic objects being located along the road course. In the illustrated image recording of the environment sensor data of projection 209, multiple detected first objects are shown which were detected with the aid of an object detection.

In addition to detected first objects 204, projection 209 furthermore includes superposed second objects 207 from a corresponding map display 205 of the depicted environment of the vehicle. Second objects 207 are shown by the marked or hatched objects and have been lined up with respective first objects 204 of environment sensor data 203.

First and second objects 204, 207 in the illustrated embodiment include static objects in the environment of the vehicle, e.g., road 215, road markings 217, line-type road markings 219, road boundaries 221, street lights 223, power poles 225 and traffic light poles 227. In the depicted embodiment, a further first object 206 in the form of another vehicle 229 is also shown, which was detected as a dynamic object in the object detection based on environment sensor data 203.

In the illustrated embodiment, only an excerpt is shown of second objects of the map display, which are illustrated superposed to corresponding first objects 204 of environment sensor data 203 in each case. Alternatively, any number of other second objects of the map display are able to be shown in projection 209.

Projection 209 is based on an alignment of a map display that brings the respective environment of the vehicle imaged in environment sensor data 203 to the perspective alignment of environment sensor data 203. This may be achieved by varying the alignment of map display 205 in such a way that second objects 207 shown in map display 205 are aligned with corresponding first objects 204 of the environment sensor data, as illustrated in FIG. 3 by the superposed positioning or imaging of depicted first objects 204 and the corresponding second objects 207 in each case.

Through projection 209 in which first objects 204 of environment sensor data 203 as well as second objects 207 of corresponding map display 205 are shown, an object detection of the objects in the environment of the vehicle is able to be improved. For example, road markings 217 or line-type road markings 219 or road boundaries 221 that are not easily detectable in environment sensor data 203 because of poor visual conditions or due to snowfall, for example, or because of considerable wearing of the road markings on the roadway, are able to be supplemented by corresponding markings from map display 205. The road markings, which may possibly be difficult to identify by the object detection based on environment sensor data 203, are thus still able to be considered in the scene interpretation in a meaningful manner and also in the related control of the vehicle while taking the corresponding information from map display 205 into account. Moreover, through second objects 207 of the map display, objects that are not detectable by the object detection because they are blocked or hidden by other objects, for instance, are able to be considered in the scene interpretation. In FIG. 3, the road course of road 215 is not visible to the object detection because of other vehicles 229 traveling in front. However, superposed second objects 207 of the map display, in particular depicted road markings 217 or road boundaries 221, make it possible to view the course of the roadway beyond the position of the further vehicle 229 located in front.

The same applies to traffic signs, for instance, which may possibly not be visible because of a vehicle driving in front. These can likewise be included in the scene interpretation by considering the map display, although they must be excluded from the object detection of the environment sensor data. Such a situation is not explicitly shown in FIG. 3.

Figure 4:
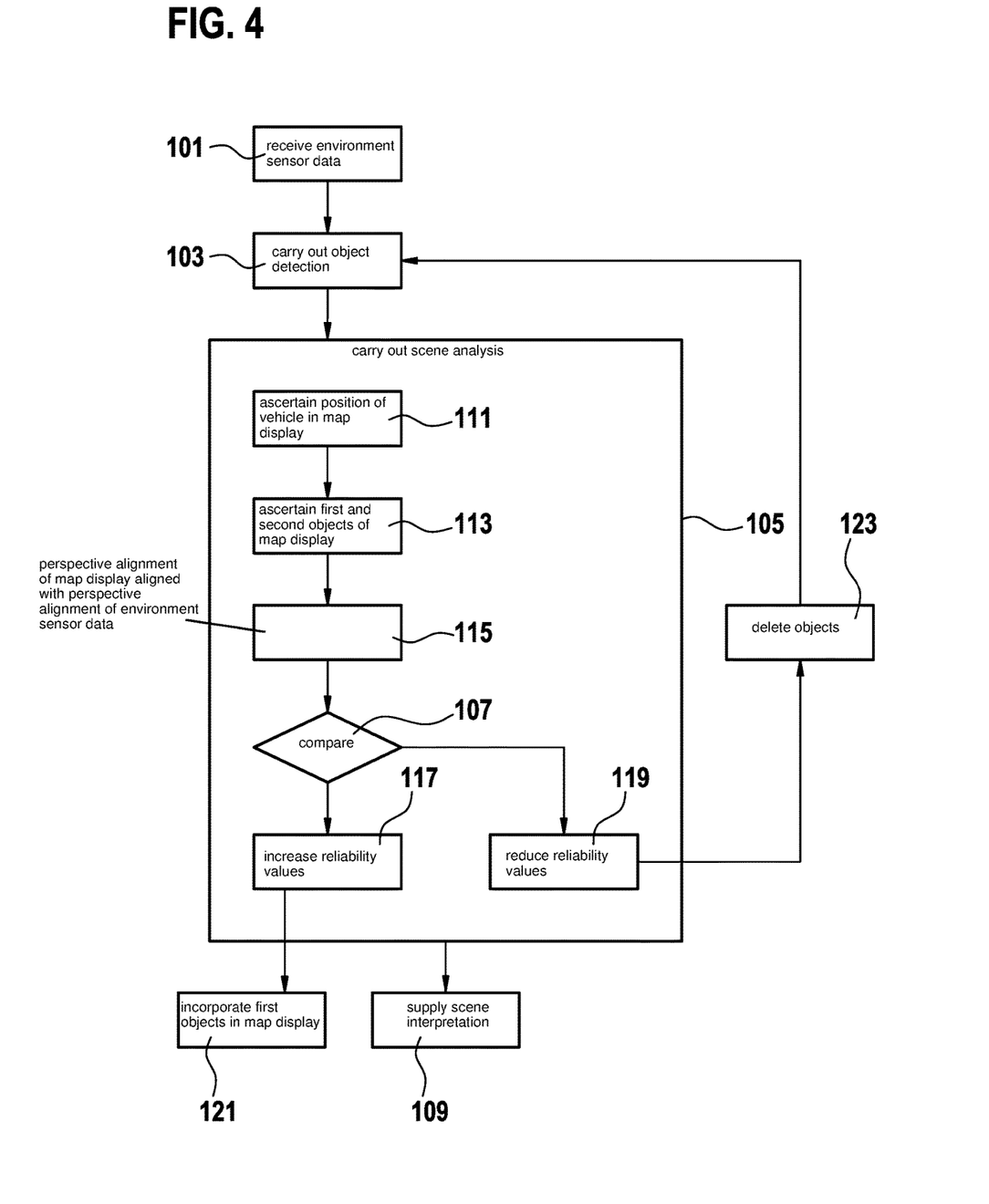
FIG. 4 shows a flow diagram of a method for a scene interpretation of an environment of a vehicle according to an example embodiment of the present invention.

FIG. 4 shows a flow diagram of a method 100 for a scene interpretation of an environment of a vehicle 200 according to one embodiment.

For the scene interpretation of an environment of a vehicle according to method 100 of the present invention, environment sensor data 203 from at least one environment sensor of a vehicle are first received in a method step 101. Similar to FIGS. 1 and 3, environment sensor data 203 may include image or video data from corresponding environment sensors. As an alternative or in addition, the environment sensor data may include LIDAR data, radar data or data from further conventional environment sensors from the related art.

In a method step 103, an object detection based on environment sensor data 203 is subsequently carried out and first objects 204 are detected in the environment of the vehicle. According to FIGS. 1 and 3, first objects 204 may primarily include static objects in the environment of the vehicle and, for example, encompass objects or properties of road 215 on which the vehicle is traveling.

In a method step 105, a scene analysis of the environment of the vehicle is carried out by taking into consideration detected first objects 204 and second objects 207 stored in a map display 205 of the environment.

To this end, in a method step 111, a position of the vehicle in map display 205 is initially ascertained in the illustrated embodiment. Positioning data based on which a positioning of the vehicle is possible are taken into account for this purpose. The positioning data, for example, may be data from a global navigation satellite system GNSS, e.g., GPS, Galileo or similar positioning data. Alternatively or additionally, the positioning data may include data of vehicle dynamics or data of a positioning system of the vehicle. Based on the positioning data, a geo-position of the vehicle is first able to be ascertained and a positioning of the vehicle in map display 205 may then be carried out on that basis. Map display 205 is able to be embodied as a geo-referenced map for this purpose. The map content in addition may be utilized for the localization in the map by comparing it with the measurements of the environment sensors.

In a method step 113, first objects 204 and second objects 207 of map display 205 that correspond to first objects 204 are ascertained in environment sensor data 203. The ascertainment of second objects 207 in map display 205 is carried out by taking the position of the vehicle on map display 205 into consideration, so that only second objects 207 are ascertained that are located in the environment of the vehicle according to the ascertained position of the vehicle. According to the embodiment in FIG. 3, for example, first and second objects 204, 207 ascertained in this way may be illustrated roads 215, road markings 217, road line markings 219, road boundaries 221, street lights 223, power poles 225, or traffic light poles 227. Alternatively, it is also possible to ascertain other static objects in the environment, which are taken into account both by environment sensor data 203 and map display 205.

In a method step 115, the perspective alignment of map display 205 is then aligned with the perspective alignment of the environment sensor data. To this end, ascertained second objects 207 of map display 205 are aligned with corresponding first objects 204 of environment sensor data 203. This is accomplished by varying the alignment of the map display until a desired mutual alignment of first and second objects 204, 207 is achieved. Such a projection 209 is shown in FIG. 3, where marked second objects 207 are lined up with corresponding first objects 204 of environment sensor data 203 in each case.

Next, in a method step 107, first objects 204 detected in the object detection based on the environment sensor data are compared with corresponding second objects 207 of map display 205. In addition to the positioning of the individual objects in the environment sensor data and map display 205 of the environment, the comparison between first and second objects 204, 207 may include semantic information of the first and second objects 204, 207 and also shape information of first and second objects 204, 207. The semantic information of first objects 204 of environment sensor data 203 is based on the object detection in this case, while the semantic information of second objects 207 is stored in map display 205.

In a method step 117, reliability values of first objects 204 detected by the object detection are then increased if they are represented by corresponding second objects 207 on map display 205.

As an alternative, the reliability values of detected first objects 204 are correspondingly reduced in a method step 119 if they are not represented by corresponding second objects 207 in the map display. The reliability values include the reliability values assigned to each detected object in the object detection. The object detection of first objects 204 that are also taken into account in map display 205 is thus evaluated at a higher reliability, whereas an object detection of first objects 204 for which no correspondence is given in map display 205 are taken into account at a reduced reliability.

After the scene analysis has been concluded, a scene interpretation of the environment of the vehicle is then supplied to a vehicle control of the vehicle in a subsequent method step 109, the scene interpretation considering at least first objects 204 detected in the object detection that agree with corresponding second objects 207 of map display 205. According to the illustrated embodiment, the first objects 204 that agree with the second objects of map display 205 are able to be taken into account at a greater reliability for this purpose.

In contrast, first objects 204 that are not represented by corresponding second objects 207 in map display 205 will be disregarded in the scene interpretation if the map display satisfies a reliability criterion and/or if reliability values assigned to first objects 204 do not reach or exceed a predefined limit value. The reliability criterion of map display 205, for example, may result from the fact that a representation of the environment of the vehicle had been provided with sufficient reliability at earlier points in time by corresponding map display 205. In this way, first objects incorrectly or erroneously detected by the object detection may be disregarded in the scene interpretation. For example, the object detection could mistakenly or incorrectly detect as road markings cast shadows of power poles 225 on the road surface of road 215 of FIG. 3. Through a comparison with the road markings of map display 205, they are able to be identified as erroneously detected road markings and thus not be included in the scene interpretation.

In addition, second objects 207 of map display 205 for which the object detection could not identify any first objects 204 of environment sensor data 203 may be considered in the scene interpretation if map display 205 satisfies the mentioned reliability criterion. The reliability criterion indicates that because of the corresponding reliability of map display 205, a prioritization of the information listed in the map display is legitimate in comparison with the information ascertained by the object detection based on environment sensor data 203.

In addition, in a method step 121, first objects that up to this point were not represented in map display 205 by corresponding second objects 207 are able to be incorporated into map display 205. Such an incorporation of first objects 204 takes place when the reliability values of corresponding first objects 204 reach or exceed the predefined limit value.

Alternatively or additionally, in a further method step 123, a deletion of first objects 204 in the object detection may be performed if corresponding first objects 204 are not represented by corresponding second objects 207 in map display 205 and if map display 205 satisfies the reliability criterion or if the respective first objects 204 have reliability values below the predefined limit value. Alternatively or additionally, second objects 207 may be deleted from the map display in method step 123 if corresponding first objects 204 were not detected in the object detection. This may particularly be done if corresponding first objects 204 were not detected multiple times, which tends to indicate that a brief and/or temporary change in the road course has occurred that has not yet been considered in the map display. The evaluation of whether the missing detection of corresponding first objects 204 is based on a faulty object detection or a faulty map display is able to be carried out based on the performance at earlier times both of the object detection and the map display. For instance, if map display 205 has functioned without error up to this point while a few faulty detections have occurred in the object detection, then second objects 207 may remain on map display 205. On the other hand, if the object detection has been functioning without error until now while errors were detected on map display 205, then second objects 207 can be deleted from the map display.

By comparing the first objects of environment sensor data 203 and second objects 207 of map display 205, it is furthermore possible to detect objects that are unable to be unequivocally identified by the object detection on the basis of environment sensor data 203. For example, by comparing the road geometries which are able to be depicted very precisely by map display 205, obstacles such as lost loads or other objects on the road can be detected that would not have been unambiguously detectable using an object detection alone. In addition, dynamic, moving objects in the scene of the environment that cover static objects and that would not be unequivocally detectable by the object detection alone based on the environment sensor data are able to be detected by comparing environment sensor data 203 to map display 205.

The method according to the present invention is able to be used for environment sensor data from any number of environment sensors. In particular, method 100 according to the present invention is able to be carried out in a cyclical manner so that a constant comparison of the environment sensor data or detected first objects 204 with respective second objects 207 of map display 205 is able to take place. Further first objects 206 which are detected in the object detection based on environment sensor data 203 and predominantly describe dynamic objects such as other road users are largely disregarded in method step 107 and following method steps 117 to 123. In the course of the reliability values of the detected first objects, which were possibly increased in method step 117, an increase in the reliability of detected further first objects 206 may occur as well.

Figure 5:
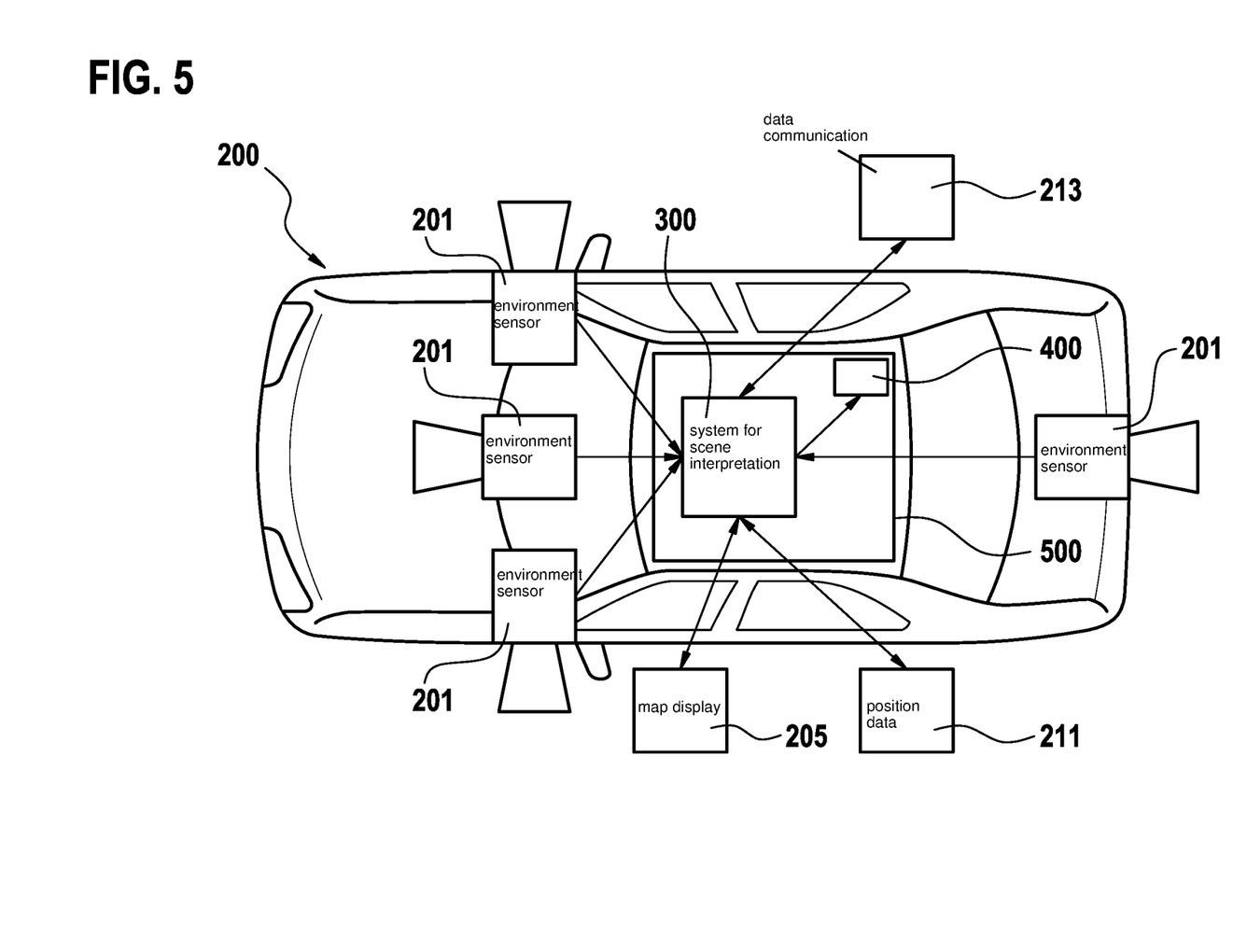
FIG. 5 shows a schematic representation of a system for a scene interpretation of an environment of a vehicle according to an example embodiment of the present invention.

FIG. 5 shows a schematic representation of a system 300 for a scene interpretation of an environment of a vehicle 200 according to one embodiment.

FIG. 5 shows a vehicle 200 having a plurality of environment sensors 201. Illustrated vehicle 200 furthermore includes a system 300 for a scene interpretation of an environment of a vehicle 200, system 300 being designed to carry out method 100 for a scene interpretation of an environment of vehicle 200 according to the present invention. System 300 may consider for this purpose a map display 205 according to the afore-described embodiments. Map display 205 may particularly be installed on a processing unit 500 of vehicle 200 or be carried out on this unit. For example, map display 205 is able to be installed on processing unit 500 via a corresponding data communication 213 and thus be executed by system 300. System 300 may furthermore take position data 211, e.g., from a GNSS positioning system, into account.

Vehicle 200 moreover includes a vehicle control 400, which is able to be executed on processing unit 500 and takes the environment interpretation generated by system 300 into consideration in the control of vehicle 200.

Figures 6, 7:
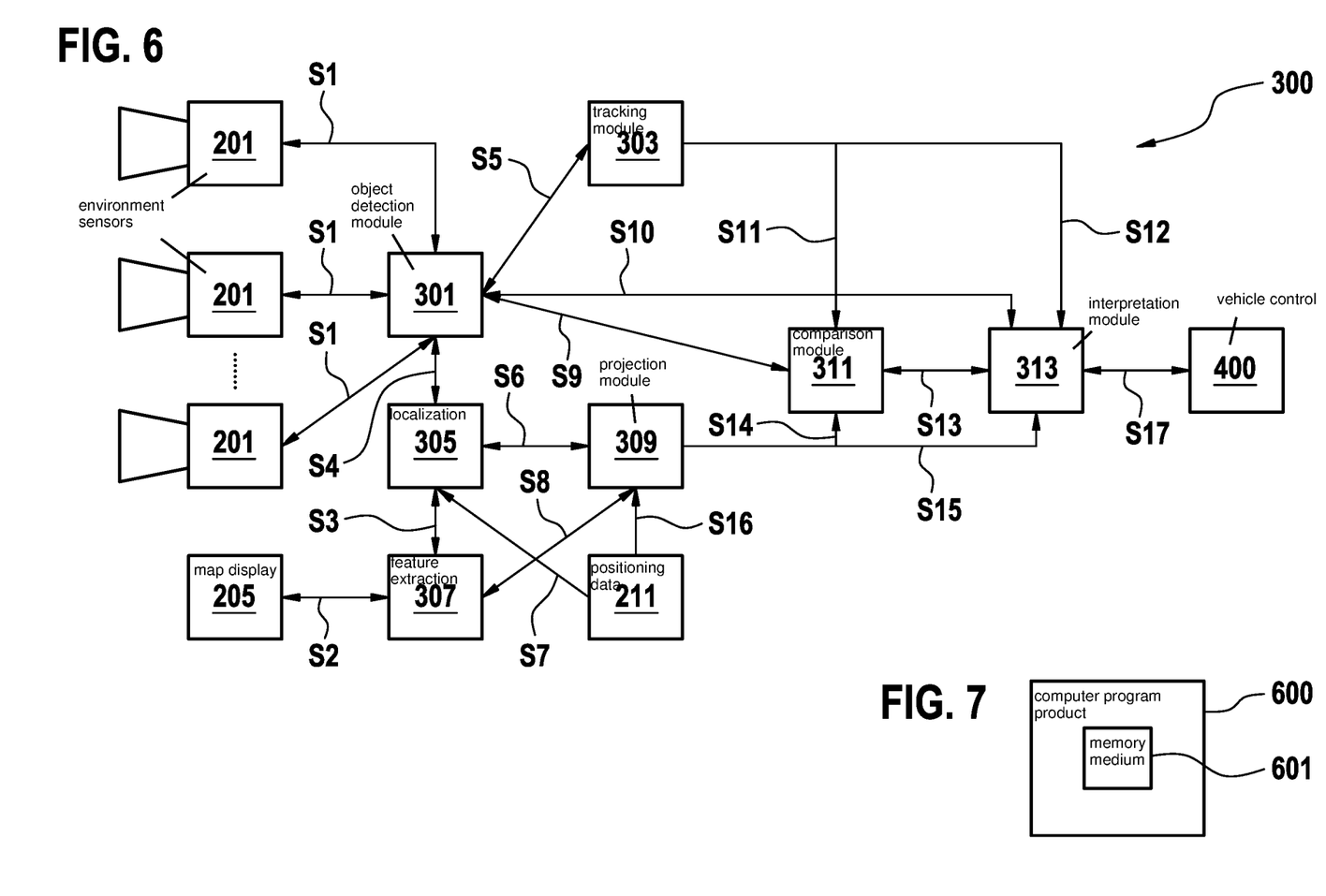
FIG. 6 shows a further schematic representation of the system for a scene interpretation of an environment of a vehicle according to a further example embodiment of the present invention.
FIG. 7 shows a schematic representation of a computer program product.

FIG. 6 shows a further schematic representation of system 300 for a scene interpretation of an environment of a vehicle 200 according to a further embodiment.

In the illustrated embodiment, system 300 considers the environment sensor data from environment sensors 201 that are conveyed via first interfaces S1 to an object detection module 301, which carries out a corresponding object detection based on the environment sensor data. Object detection module 301 furthermore communicates via a fifth interface S5 with a tracking module 303 in which tracked environment information of the vehicle is taken into account.

Map display 205 is conveyed via a second interface S2 to a feature extraction module 306 designed to extract corresponding features of map display 205, in particular corresponding second objects according to the afore-described embodiments. The corresponding extracted second objects are conveyed to a localization module 305 via a third interface S3. Localization module 305 furthermore considers positioning data 211 that it receives with the aid of a seventh interface S7. Based on the features of map display 205 and positioning data 211, localization module 305 determines a position of vehicle 200 in map display 205.

Via a projection module 309 and based on the first features of object detection module 301 that are conveyed to projection module 309 via fourth and sixth interfaces S4, S6, and the positioning of localization module 305, e.g., positioning data 211 which are conveyed to projection module 309 via a sixteenth interface S16, and second objects 207 ascertained by feature extraction module 307 and conveyed to projection module 309 via an eighth interface S8, projection module 309 ascertains a projection 209 according to FIG. 3. To this end, as described above, an adaptation of the perspective alignment of map display 205 to the perspective alignment of environment sensor data 203 is performed by aligning second features 207 relative to first features 204 of the environment sensor data.

Based on the first features of the object detection carried out by object detection module 307, the features of tracking module 303, and the first and second features 204, 207 of projection 209 generated by projection module 309, a comparison module 311 performs a corresponding comparison between first objects 204 of the object detection and second objects 207 of map display 205 according to method step 107. A data communication between comparison module 311 and object detection module 301 is carried out via a ninth interface S9, a data communication with tracking module 303 is carried out via an eleventh interface S11, and a data communication with projection module 309 is carried out via a fourteenth interface S14.

Based on the comparison results of comparison module 311 and based on the results of projection module 309, object detection module 301 and tracking module 303, a scene interpretation of the environment of the vehicle is carried out by an interpretation module 313. A data communication between interpretation module 313 and the mentioned modules takes place via interfaces S12, S13, S10 and S15.

Via a seventeenth interface S17, the scene interpretation generated by the interpretation module is made available to vehicle control 400.

FIG. 7 shows a schematic representation of a computer program product 600 according to an embodiment.

In the illustrated embodiment, computer program product 600 is stored on a memory medium 601. Memory medium 601 may be a conventional memory medium.

What is claimed is:

1. A method of a control device of a vehicle, the method comprising the following steps:
receiving environment sensor data from at least one environment sensor of the vehicle;
carrying out an object detection based on the environment sensor data by which first objects in an environment of the vehicle are detected;
carrying out a scene analysis of the environment by taking into consideration the detected first objects and second objects stored in a map display of the environment, the map display being a representation of valid map data, the scene analysis including comparing the first objects detected in the object detection based on the environment sensor data to the second objects of the map display;
generating a scene representation based on the scene analysis; and
performing an automated control of the vehicle according to the generated scene representation;
wherein the method includes at least one of the following two features (I)-(II):
(I) the method further comprises, prior to the comparing, adapting a perspective of the map display to align with a perspective of the environment sensor data, thereby providing spatial agreement of the map display with the environment sensor data; and
(II) the method further comprises determining, on an object-by-object basis, respective reliabilities of the first objects and respective reliabilities of the second objects, wherein the generating of the scene representation includes selecting which of the first objects to include in the scene representation and which of the second objects to include in the scene representation depending on the respective reliabilities of the first objects and the second objects.

2. The method as recited in claim 1, wherein:
the carrying out of the scene analysis includes:
ascertaining a position of the vehicle on the map display by taking positioning data into consideration; and
ascertaining which of the first objects of the environment sensor data and second objects of the map display correspond to one another; and
the adapting of the perspective of the map display is performed according to an alignment of the ascertained second objects of the map display with the ascertained first objects of the environment sensor data.

3. The method as recited in claim 1, wherein, when comparing the first objects and the second objects, semantic information of the first objects and the second objects and/or positioning information of the first objects in the environment sensor data and of the second objects in the map display, is taken into consideration.

4. The method as recited in claim 1, wherein the carrying out of the scene analysis is based on the determining of the respective reliabilities, and the determining of the respective reliabilities includes:
increasing reliability values of those of the first objects that were detected in the object detection and are represented by corresponding second objects in the map display; and/or
reducing reliability values of those of the first objects that are detected in the object detection and are not represented by corresponding second objects in the map display.

5. The method as recited in claim 1, further comprising:
including those of the first objects in the map display that are not represented by corresponding second objects in the map display when reliability values assigned to the first objects attain or exceed a predefined limit value.

6. The method as recited in claim 5, wherein, when there is an inconsistency between the first objects and the second objects, a reliability criterion that the map display has achieved a reliable representation of the environment at earlier points in time is taken into account in deciding whether to resolve the inconsistency in the generating of the scene representation.

7. The method as recited in claim 1, wherein those of the first objects that are not represented by corresponding second objects in the map display are disregarded in the scene interpretation when the map display satisfies a reliability criterion.

8. The method as recited in claim 1, wherein those of the second objects of the map display for which no corresponding first objects were detected in the object detection are taken into account in the scene interpretation when the map display satisfies the reliability criterion.

9. The method as recited in claim 1, further comprising:
deleting those of the first objects in the object detection that are not represented by second objects in the map display when the map display satisfies a reliability criterion.

10. The method as recited in claim 1, wherein the second objects of the map display represent static objects of the environment of the vehicle and include road geometries and/or road markings and/or road line markings and/or road boundaries and/or traffic signs and/or traffic light systems and/or infrastructure objects and/or bicycle paths and/or buildings and/or vegetation.

11. The method as recited in claim 1, wherein the map display is a geo-referenced map.

12. The method as recited in claim 1, wherein: (i) the environment sensor data include image data and/or video data and/or or LiDAR data and/or RADAR data, and/or (ii) the positioning data include GNSS data and/or position sensor data and/or sensor data for acquiring vehicle dynamics.

13. The method as recited in claim 1, wherein the object detection is carried out by a trained neural network or a plurality of trained neural networks.

14. The method as recited in claim 1, wherein, when comparing the first objects and the second objects, shape information of the first objects and of the second objects is taken into consideration.

15. The method as recited in claim 1, wherein those of the first objects that are not represented by corresponding second objects in the map display are disregarded in the scene interpretation when reliability values allocated to the first objects do not reach or exceed a predefined limit value.

16. The method as recited in claim 1, wherein those of the second objects for which no corresponding first objects were detected in the object detection are deleted in the map display when the object detection does not satisfy a reliability criterion.

17. The method as recited in claim 1, further comprising:
deleting those of the first objects in the object detection that are not represented by second objects in the map display when reliability values allocated to the first objects do not attain or exceed the predefined limit value.

18. The method as recited in claim 1, further comprising:
deleting second objects in the map display for which no corresponding first objects were detected when the map display does not satisfy the reliability criterion.

19. The method as recited in claim 1, wherein those of the first objects that are not represented by corresponding second objects in the map display are disregarded in the scene interpretation based on a combination of factors that the map display satisfies a reliability criterion and reliability values allocated to the first objects do not reach or exceed a predefined limit value.

20. The method as recited in claim 1, wherein the method further comprises, prior to the comparing, the adapting of the perspective of the map display to align with the perspective of the environment sensor data, thereby providing the spatial agreement of the map display with the environment sensor data.

21. The method as recited in claim 1, wherein the method further comprises the determining, on the object-by-object basis, the respective reliabilities of the first objects and respective reliabilities of the second objects, and wherein the generating of the scene representation includes the selecting of which of the first objects to include in the scene representation and which of the second objects to include in the scene representation depending on the respective reliabilities of the first objects and the second objects.

22. The method as recited in claim 21, wherein inconsistencies between the first objects and the second objects are resolved for a determination of which objects are represented in the scene representation according to how the respective reliabilities of the first objects relate to the respective reliabilities of the second objects.

23. The method as recited in claim 1, wherein inconsistencies between the first objects and the second objects are resolved for a determination of which objects are represented in the scene representation according to respective reliabilities of the first objects relative to an ascertained reliability of the map display.

24. A processing unit of a vehicle, the processing unit comprising a processor system including at least one processor, wherein the processor system is configured to:
- receive environment sensor data from at least one environment sensor of the vehicle;
- carry out an object detection based on the environment sensor data by which first objects in an environment of the vehicle are detected;
- carry out a scene analysis of the environment by taking into consideration the detected first objects and second objects stored in a map display of the environment, the map display being a representation of valid map data, the scene analysis including comparing the first objects detected in the object detection based on the environment sensor data to the second objects of the map display;
- generate a scene representation based on the scene analysis; and
- perform an automated control of the vehicle according to the generated scene representation;
- wherein the processing unit is configured to additionally perform at least one of the following steps (I)-(II):
  - (I) prior to the comparison, adapt a perspective of the map display to align with a perspective of the environment sensor data, thereby providing spatial agreement of the map display with the environment sensor data; and
  - (II) determine, on an object-by-object basis, respective reliabilities of the first objects and respective reliabilities of the second objects, wherein the generation of the scene representation includes selecting which of the first objects to include in the scene representation and which of the second objects to include in the scene representation depending on the respective reliabilities of the first objects and the second objects.

25. A non-transitory computer-readable medium on which is stored a computer program that is executable by a data processing unit of a vehicle, and that, when executed by the processing unit, causes the data processing unit to perform a method, the method comprising the following steps:
- receiving environment sensor data from at least one environment sensor of the vehicle;
- carrying out an object detection based on the environment sensor data by which first objects in an environment of the vehicle are detected;
- carrying out a scene analysis of the environment by taking into consideration the detected first objects and second objects stored in a map display of the environment, the map display being a representation of valid map data, the scene analysis including comparing the first objects detected in the object detection based on the environment sensor data to the second objects of the map display;
- generating a scene representation based on the scene analysis; and
- performing an automated control of the vehicle according to the generated scene representation;
- wherein the method includes at least one of the following two features (I)-(II):
  - (I) the method further comprises, prior to the comparing, adapting a perspective of the map display to align with a perspective of the environment sensor data, thereby providing spatial agreement of the map display with the environment sensor data; and
  - (II) the method further comprises determining, on an object-by-object basis, respective reliabilities of the first objects and respective reliabilities of the second objects, wherein the generating of the scene representation includes selecting which of the first objects to include in the scene representation and which of the second objects to include in the scene representation depending on the respective reliabilities of the first objects and the second objects.

* * * * *